United States Patent
Gassmann

(12) 
(10) Patent No.: US 6,286,391 B1
(45) Date of Patent: Sep. 11, 2001

(54) TORQUE-SENSING LOCKING DIFFERENTIAL WITH REDUCED PARTS

(75) Inventor: Theodor Gassmann, Rochester, MI (US)

(73) Assignee: GKN Viscodrvie Gmbh, Lohmar (DE)

( * ) Notice: Subject to any disclaimer, the term of this patent is extended or adjusted under 35 U.S.C. 154(b) by 0 days.

(21) Appl. No.: 09/387,003

(22) Filed: Aug. 31, 1999

(30) Foreign Application Priority Data

Sep. 1, 1998 (DE) .............................................. 198 39 720

(51) Int. Cl.[7] .................................................... F16H 48/12
(52) U.S. Cl. .............................................. 74/650; 475/164
(58) Field of Search .............................. 74/650; 475/164, 475/225

(56) References Cited

U.S. PATENT DOCUMENTS

| | | | |
|---|---|---|---|
| 2,555,044 | * 5/1951 | Lewis | 74/650 |
| 3,548,683 | * 12/1970 | Fisher | 74/650 |
| 3,895,540 | * 7/1975 | Davidson | 475/164 |
| 5,022,802 | * 6/1991 | Yokoi | 409/52 |
| 5,913,949 | * 6/1999 | Valasopoulos | 74/650 |
| 5,983,754 | * 11/1999 | Tyson et al. | 74/650 |

FOREIGN PATENT DOCUMENTS

8805139 * 7/1988 (WO).

* cited by examiner

*Primary Examiner*—Rodney H Bonck
*Assistant Examiner*—Ha Ho

(57) ABSTRACT

A locking differential in which the two side gears comprise end toothings facing one another, and the differential component is a differential disc with end toothings on both faces, with the end toothings on each face co-operating with one of the side gears' end toothings. The number of teeth of each pair of inter-engaging end toothings differs by one, and the ratio of the number of teeth of both pairs of toothings is unequal. The differential disc is mounted to wobble between the side gears so that, by means of diametrically-opposed portions of its two sets of end toothings, it engages the associated sets of end toothings of the side gears. The desired ratios of the numbers of teeth exist if the differential disc is provided with end toothings with identical numbers of teeth, and one side gear comprises a set of end toothings having one tooth fewer ($z=n-1$) and the other side gear having one tooth more. It is thus possible to achieve an unequal distribution of torque between the two side gears. The desired ratios of the numbers of teeth also are achieved by having both side gears provided with end toothings with identical numbers of teeth, and the differential disc is provided with end toothings with one tooth fewer on one side and one tooth more on the other side.

5 Claims, 7 Drawing Sheets

TORQUE-SENSING LOCKING DIFFERENTIAL WITH REDUCED PARTS

BACKGROUND OF THE INVENTION

It is known for a locking differential to have a differential carrier contained within a drive housing and rotatable around an axis, with two spaced-apart side gears also contained within the drive housing and rotatable relative to one another, and having a differential component which co-operates with the side gears by means of alternately engaging toothings.

The most commonly used type of differential drive is the bevel gear differential. To the extent that such a differential is to have a self-limiting or self-locking effect (both terms herein used in the sense of slip-limiting), it is necessary to provide a locking device, preferably a multi-plate coupling between two of the three basic components, i.e., the differential carrier and the two spaced-apart side gears, the latter being rotatable relative to one another around a common axis.

A new type of differential is known from WO 96/41088 in which side gears are provided with one or two inclined disc faces which face one another, with disc elements resting against the disc faces in a wobbly manner. Two of the disc elements are non-rotatably connected to one another, with one disc rotating with the differential carrier. It will be readily appreciated that the construction of such an assembly is extremely complex.

In European Patent 0 619 863 B1, there is disclosed a differential drive wherein a plurality of sliding blocks is arranged between two side gears with opposed end toothings. The sliding blocks are axially-displaceable relative to one another, and have double wedge faces at their ends. Again, it will be readily appreciated that the construction of such an assembly is extremely complex.

It is the objective of the present invention to provide a new type of differential drive with a self-inhibiting or self-locking ti effect, with a simple design and relatively few parts.

SUMMARY OF THE INVENTION

A The present invention is essentially embodied in and carried out by a locking differential in which the two side gears comprise end toothings facing one another, and the differential component is a differential disc with end toothings on both faces, with the end toothings on each face co-operating with one of the side gears' end toothings. The number of teeth of each pair of inter-engaging end toothings differs by one, and the ratio of the number of teeth of both pairs of toothings is unequal. The differential disc is mounted to wobble between the side gears so that, by means of diametrically-opposed portions of its two sets of end toothings, it engages the associated sets of end toothings of the side gears. Variations on this design are set forth herein.

The first type of locking differential wherein the differential element is non-rotatably coupled to the differential carrier so as to rotate therewith is preferably designed symmetrically, since it is preferably used as an axle differential. The side gears are connectable to plugged-in side shafts. The second type of locking differential wherein the differential element is non-rotatably coupled to one end of a driveshaft introduced into the differential carrier is suitable as a central differential. One of the side gears has to be connected to a hollow shaft which extends co-axially relative to the driveshaft, with the axial carrier only serving to accommodate axially the side gears and the differential gear. However, it is also possible for one of the side gears to be non-rotatably connected to the differential carrier.

The term "side gears" will be used for convenience throughout this application, although the axes of the disclosed locking differentials can also be arranged in the longitudinal direction of a vehicle.

The non-rotatable connection of the differential disc which wobbles with reference to the axis can be effected by designs which correspond to those of constant-velocity universal joints and, in particular, comprise circumferentially disposed journals at the differential element, which engage a longitudinal guide in the differential carrier, or by a hub secured to the driveshaft, with torque transmitting balls being retained in ball grooves on the hub and in the differential disc. Rollers or sliding blocks may be mounted on the aforementioned journals and angularly moveable thereon. Said torque transmitting balls may be secured in a ball cage in a common plane. The ball joint design mentioned above can also be used between a driveshaft hub and the differential disc, just as the ball joint design mentioned secondly can also be used between the differential disc and the differential carrier.

According to the aforementioned first embodiment, the desired ratios of the numbers of teeth exist if the differential disc is provided with end toothings with identical numbers of teeth ($z=n$), and one side gear comprises a set of end toothings having one tooth fewer ($z=n-1$) and the other side gear having one tooth more ($z=n+1$). It is thus possible to achieve an unequal distribution of torque between the two side gears. According to the aforementioned second embodiment, the desired ratios of the numbers of teeth are achieved by having both side gears provided with end toothings with identical numbers of teeth ($z=n$), and the differential disc is provided with end toothings with one tooth fewer ($z=n-1$) on one side and one tooth more ($z=n+1$) on the other side. By using side gears provided with end toothings with identical numbers of teeth, the number of different parts required for the locking differential is reduced.

Because of the rotating and simultaneously wobbling movement of the differential disc and the above-described different numbers of teeth, the side gears rotate in different directions. Also, there is sliding friction at the tooth surfaces which are positioned at identical sliding angles with reference to the respective gear or disc elements, thereby generating the required torque-dependent locking effect. The side gears are axially supported on the differential carrier. By using axial bearings between the side gears and the differential carrier, it is possible to keep the locking effect relatively slight. If simple sliding discs are used in lieu of the axial bearings, the locking effect is increased. If friction discs are used instead of either axial bearings or sliding discs, the locking effect can be increased even further.

When the interior of the differential carrier is sealed and filled with a viscous fluid, making it a sealed hydraulic unit, the inter-engaging end toothings act similarly to two gear pumps, but there are no suction and pressure channels, causing substantial hydraulic friction losses and thereby producing a differential-speed-dependent locking effect which increases the torque-dependent locking effect of the toothings of the differential drive.

DESCRIPTION OF THE DRAWINGS

The written description of the present invention will be more fully understood when read with reference to the accompanying drawings, of which:

FIG. 3 is a sectional view through the longitudinal axis of the locking differential forming the first embodiment of the present invention shown in FIG. 1a.

DETAILED DESCRIPTION OF THE PREFERRED EMBODIMENT

Figure 1A:
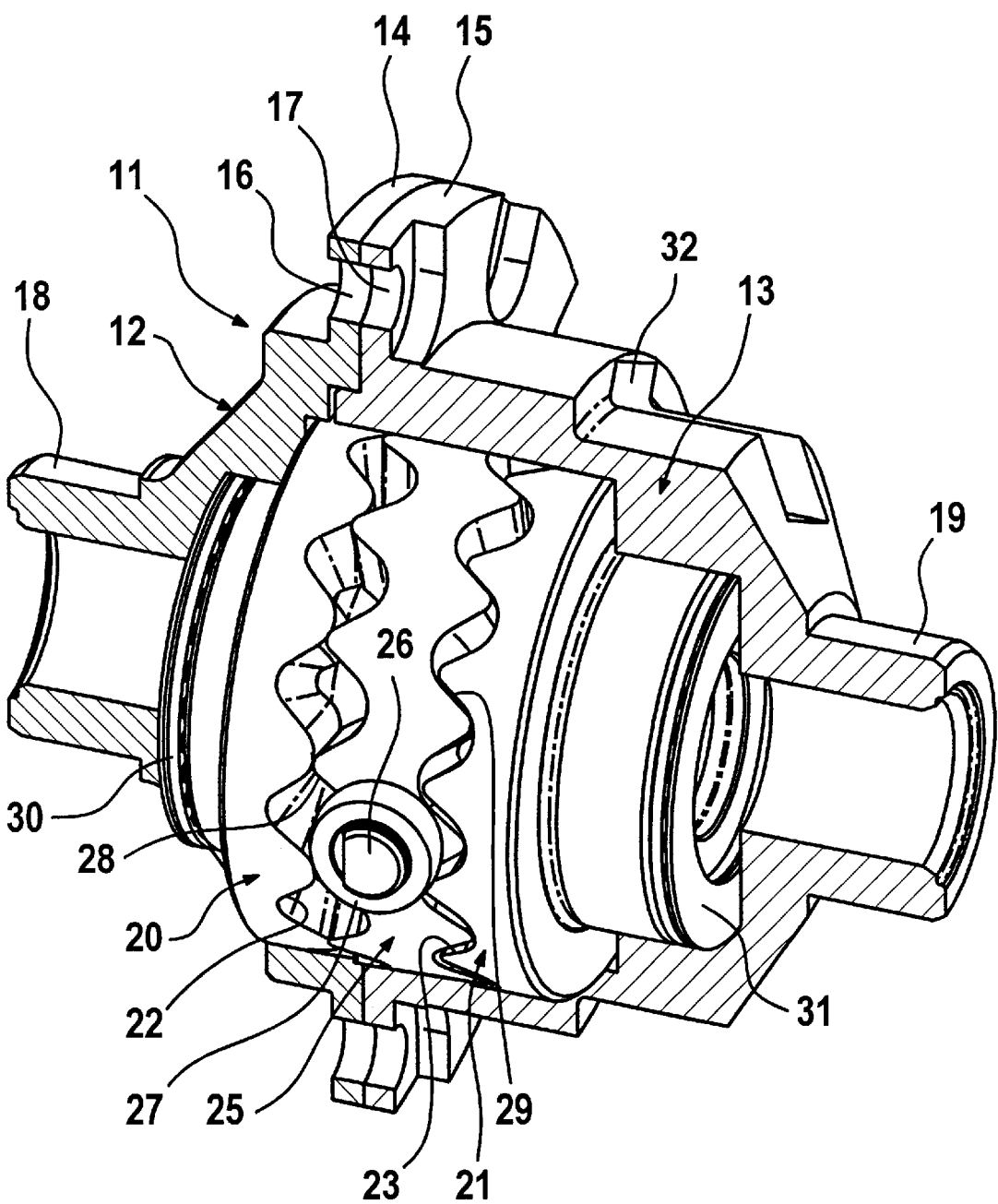
FIG. 1a is a partially broken-away perspective view of a locking differential forming the first embodiment of the present invention and having rollers on the journal.
Figure 1B:
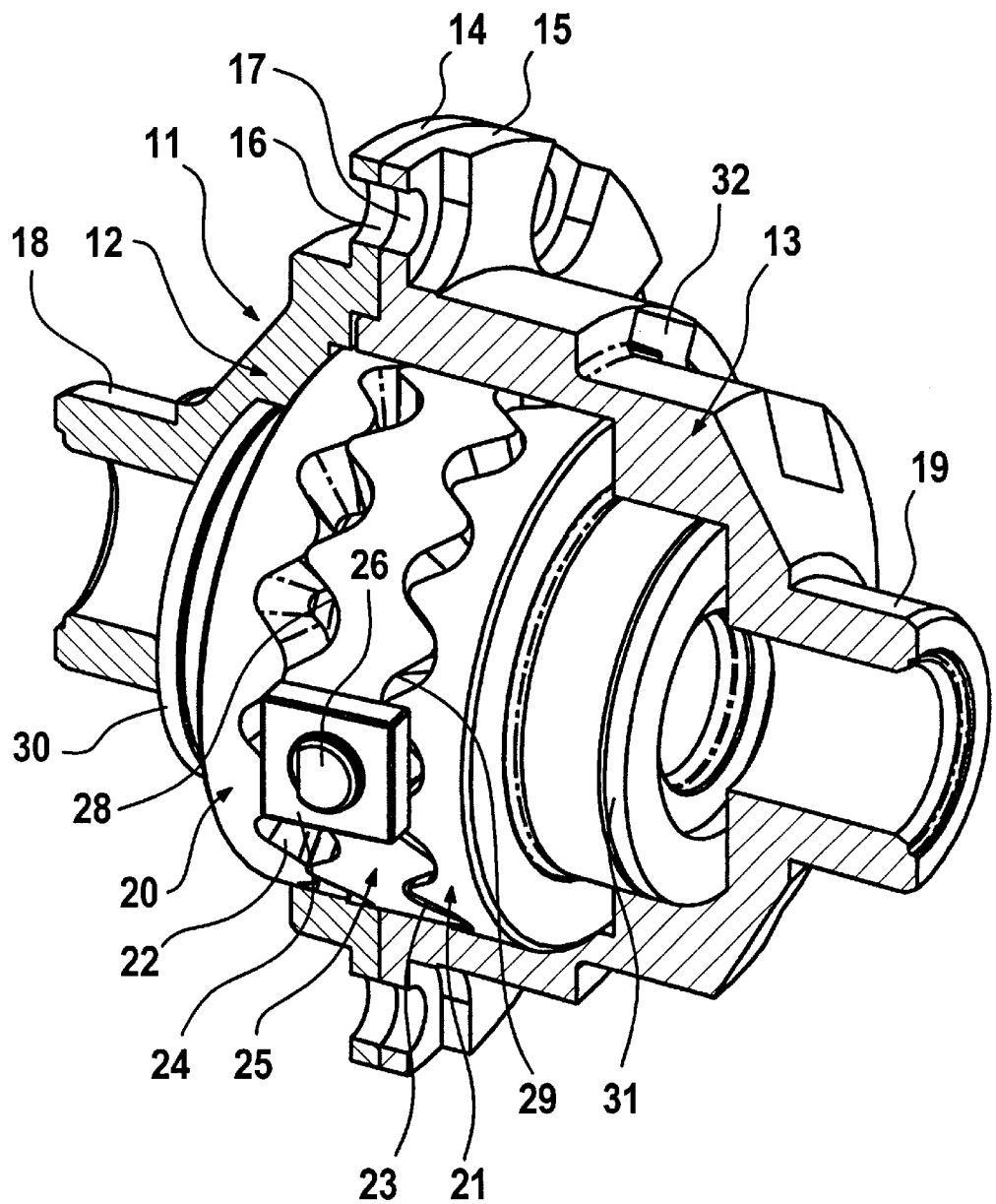
FIG. 1b is a partially broken-away perspective view of a locking differential forming the second embodiment of the present invention and having sliding blocks on the roller.

Referring now specifically to FIGS. 1a and 1b, a differential carrier 11 is formed by two housing parts 12, 13 which are fastened to one another by bolts (not shown) extending through bolt holes 16, 17 in flange parts 14, 15, respectively. A crown wheel for driving the differential carrier 11 can be attached to the flange 14, 15. The housing parts 12, 13 each comprise sleeve projections 18, 19 which, on their exterior surfaces, form bearing seats and bearing faces for rotatably supporting the differential carrier 11 in a drive housing. It is possible to insert axle shafts into the sleeve projections 18, 19, and to Hi connect the axle shafts to two side gears 20, 21 which are spaced apart and rotatably mounted within the differential carrier 11. The two side gears 20, 21 each comprise toothings 22, 23 which engage a differential disc 25 by means of associated end toothings 28, 29 on the differential disc 25. The two side gears 20, 21 are rotatably moveable in opposite directions relative to differential disc 25. The two side gears 20, 21 are axially supported within the differential carrier 11 by axial bearings 30, 31. The differential disc 25 has three circumferentially-disposed journals 26. In FIG. 1a, a roller 27 is rotatably mounted on each one of the three circumferentially-disposed journals 26. In FIG. 1b, a sliding block 24 is rotatably mounted on each one of the three circumferentially-disposed journals 26. On one side, the journal 26 is flat to provide space for machining the end toothing 28. Both the rollers 27 and the sliding blocks 24 are guided on the journal 26 by longitudinal guiding slots 32 formed in the differential carrier 11, so that the differential disc 25 rotates together with the differential carrier 11 at the same speed and is simultaneously able to wobble relative to the longitudinal axis of the differential carrier 11.

Figure 2:
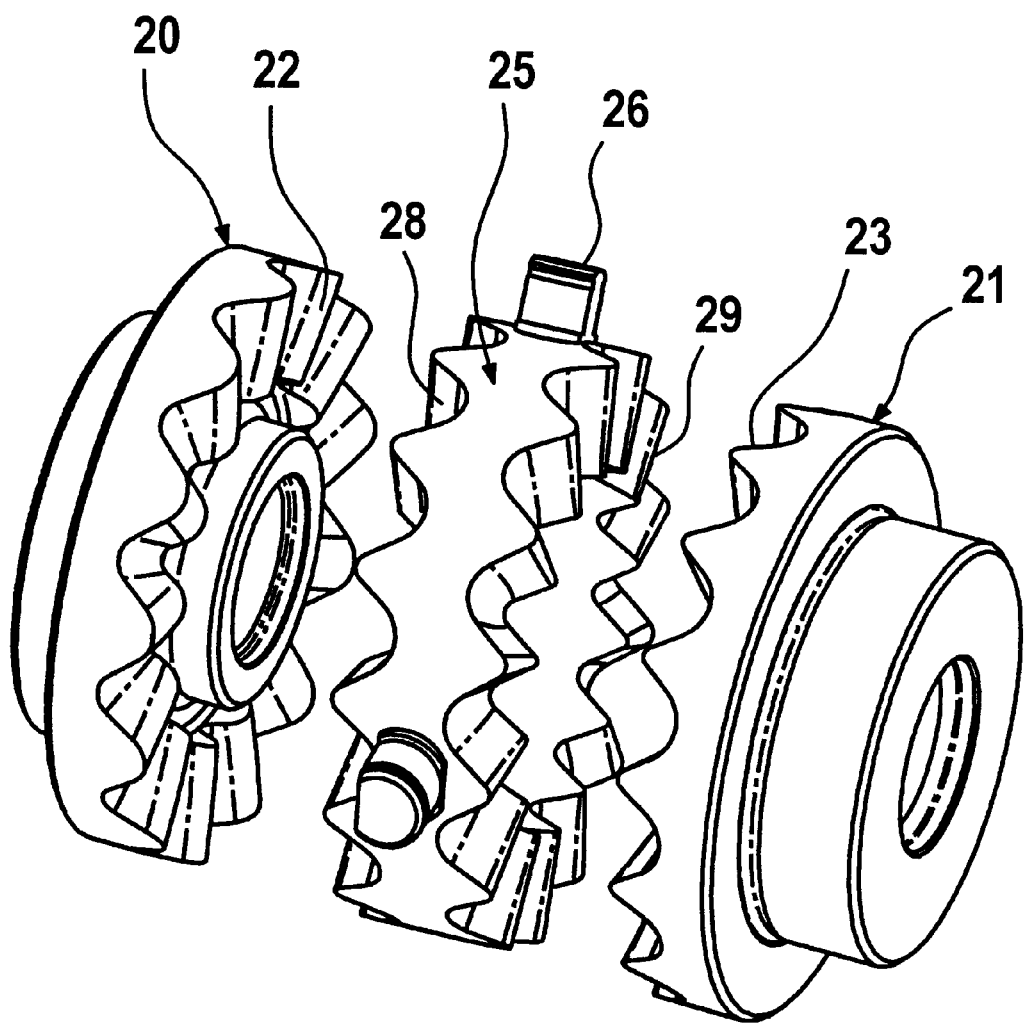
FIG. 2 is an exploded perspective view showing the pairs of end toothings forming the gear set of the locking differential forming the embodiments of the present invention shown in FIGS. 1a and 1b.

FIG. 2 shows the side gears 20, 21 and the differential disc 25 in a co-axial relationship, with two of the three journals 26 being visible. The end toothing 22 of the first side gear 20 has thirteen (13) teeth, and the co-operating end toothing 28 of the differential disc 25 has fourteen (14) teeth. The end toothing 23 of the second side gear 21 has fifteen (15) teeth, and the co-operating end toothing 29 of the differential disc 25 has fourteen (14) teeth. If one of the teeth of each set of end toothings 28, 29 of the differential disc 25 fully engages the opposed toothings 22, 23 of the first and second side gears 20, 21, respectively, the diametrically-opposed tooth of each set of it end toothings 28, 29 contacts a tooth head of the opposed toothings 22, 23, respectively, causing the differential disc 25 to be inclined within the differential carrier 11 and enabling the first and second side gears 20, 21 to rotate in a direction opposite to that of the differential disc 25.

Figure 3:
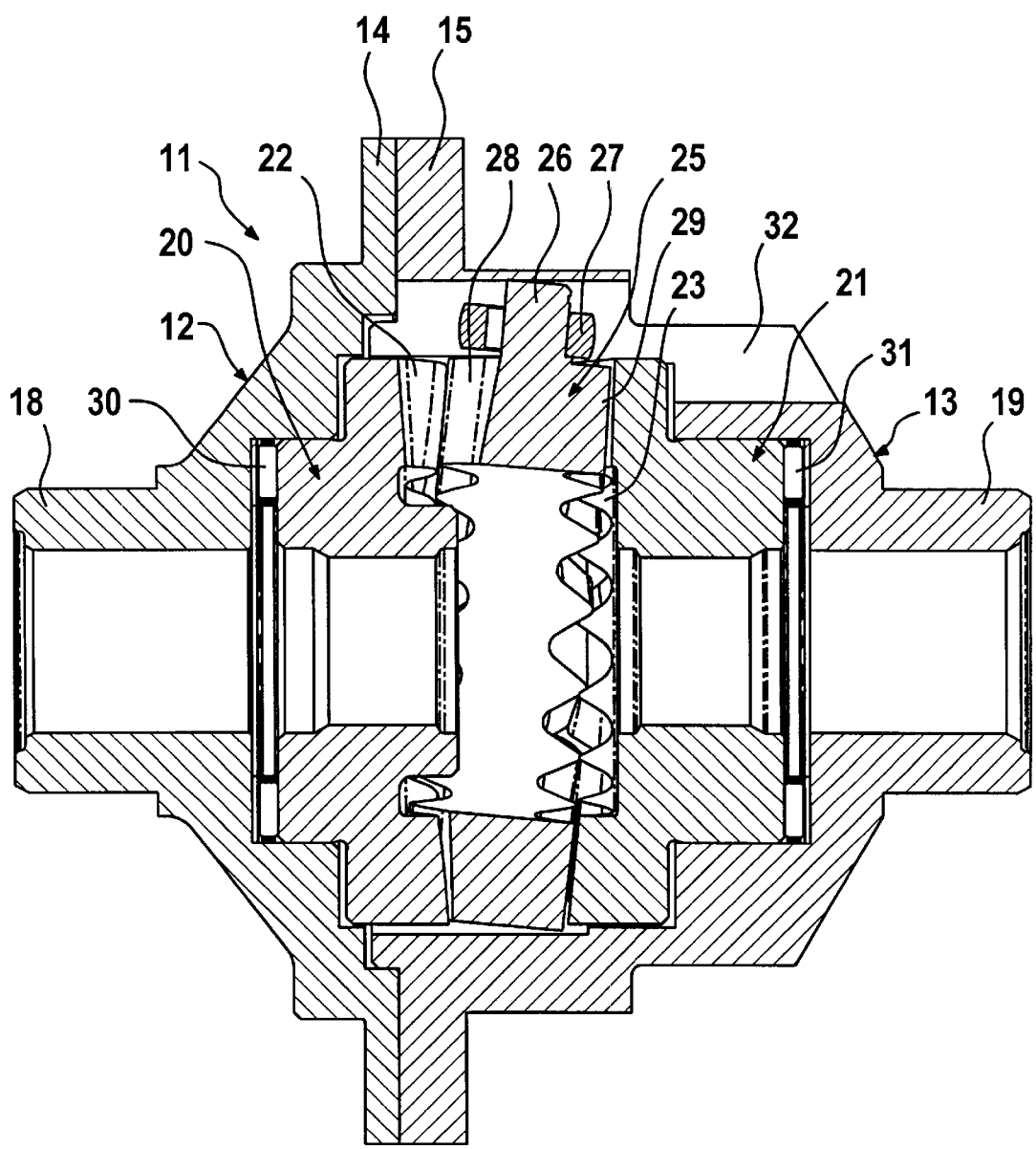

FIG. 3 shows the differential carrier 11 comprising housing halves 12, 13 with flanges 14, 15 and sleeve projections 18, 19, respectively. Axial bearings 30, 31 support the first and second side gears 20, 21 within the conjoined housing halves 12, 13, respectively. Within the differential carrier 11, the side gears 20, 21 are shown in a sectional view taken along a plane through their longitudinal axes. The differential disc 25 is shown in a sectional view taken along a plane through its longitudinal axis and through a journal 26 on which a roller 27 is mounted. Each roller 27 is retained in, and rolls along the walls of, a milled longitudinal guiding slot 32 formed in the housing half 13 of differential carrier 11. The differential disc 25 is thus caused to rotate at the same speed as the differential carrier 11. The differential disc 25 is tilted with respect to the longitudinal axis of the differential carrier 11. With specific reference to the manner of co-operation of the side gears 20, 21 and the differential disc 25, at the top of FIG. 3 two opposed teeth of the end toothings 22, 28 (slightly behind the plane of this sectional view) are shown in head-to-head contact, while at the bottom of FIG. 3 one of the teeth of end toothing 22 is shown in engagement with a tooth base of the end toothing 28. The reverse situation exists between the second side gear 21 and the differential disc 25. At the top of FIG. 3, one of the teeth of end toothing 29 is shown in engagement with a tooth base of the end toothing 23 of the second side gear 21, while at the bottom of FIG. 3 one of the teeth of end toothing 29 is shown in head-to-head contact with one of the teeth of end toothing 23. The axial bearings 30, 31 reduce the friction of the side gears 20, 21 relative to the differential carrier 11 and thus the locking effect of the differential.

Figure 4:
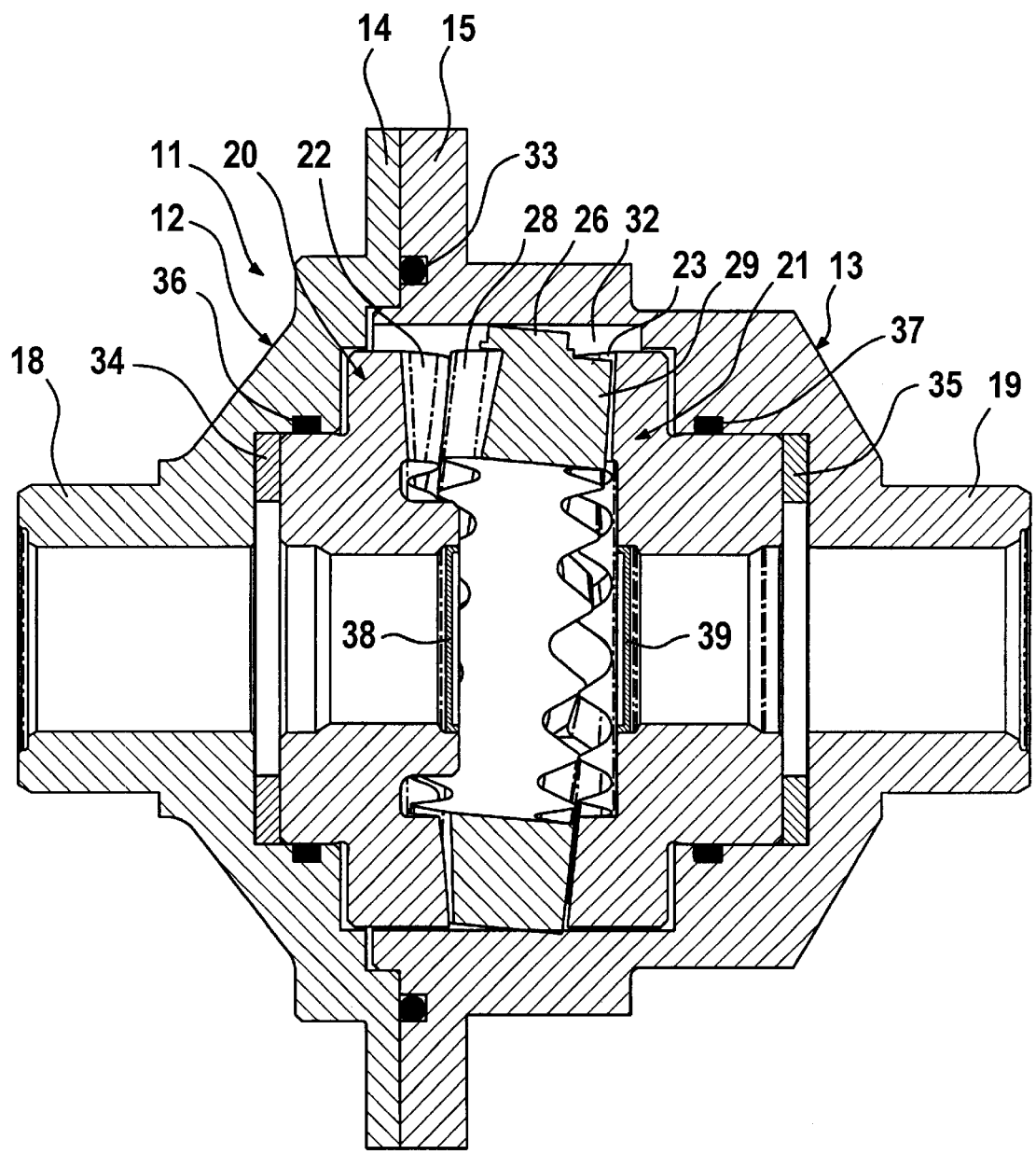
FIG. 4 is a sectional view through the longitudinal axis of the locking differential shown in FIG. 3, showing a modification thereof.

FIG. 4 shows a locking differential similar to that of FIG. 3. Identical parts have been given identical reference numbers; those parts function as described above in connection with FIG. 3. The axial bearings 30, 31 of FIG. 3 have been replaced by simple sliding discs 34, 35. Three seals 33, 36, 37 have been added, with seal 33 sealing the two housing halves 12, 13 adjacent the flanges 14, 15. Seals 36, 37 are interposed between the side gears 20, 21 and the housing halves 12, 13, respectively. Sealing covers 38, 39 are inserted into the side gears 20, 21, respectively, to complete the enclosure of a fluid-tight chamber within differential carrier 11. In this embodiment, the longitudinal guiding slot 32 is formed in housing half 13 completely within the fluid-tight chamber. A journal 26 is shortened as compared to FIG. 3, and slides within the longitudinal guiding slot 32 in direct contact therewith. When the fluid-tight chamber is filled with a sufficiently viscous fluid, there is a gear-pump effect produced by the two sets of engaging toothings which increases the resistance against any tendency of the side gears 20, 21 to rotate relative to one another and relative to the differential disc 25, thus increasing the locking effect of the differential by a percentage dependent upon differential speed.

Figure 5:
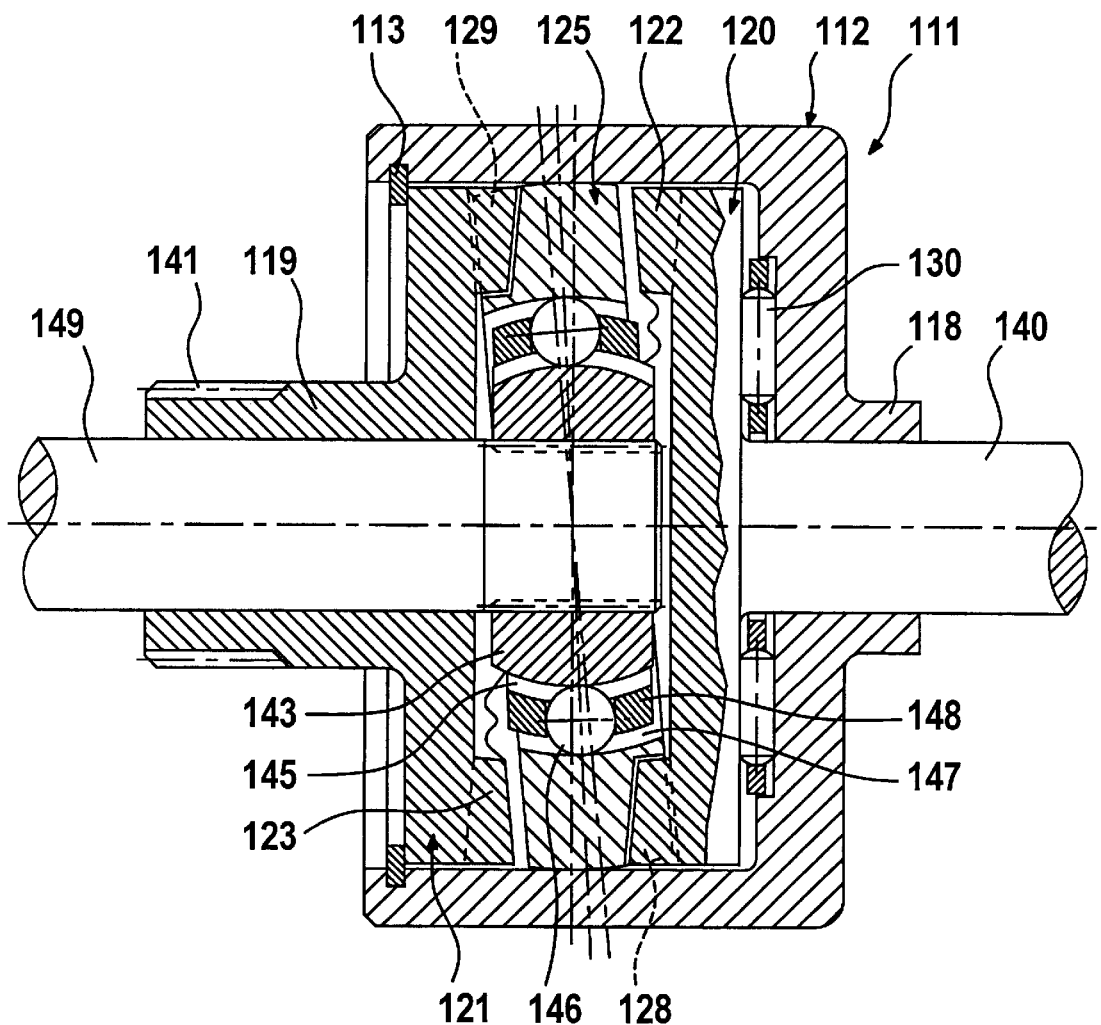
FIG. 5 is a sectional view through the longitudinal axis of a locking differential forming the third embodiment of the present invention.

FIG. 5 shows a differential carrier 111 comprising a dish-shaped housing part 112 and a retaining ring 113 inserted into an interior annular groove formed in the open end of the housing part 112 to secure a flanged sleeve projection 119 therein. A first side gear 120 is positioned opposite the flanged sleeve projection 119 within the housing part 112, and has a side shaft 140 integrally formed therewith and extending through a sleeve projection formed opposite the open end of the housing part 112. A second side gear 121 is integrally formed as part of the flanged sleeve projection 118. A driveshaft 149 extends through the sleeve projection 119 and is connected to a ball hub 143 of a ball joint unit. The side gears 120, 121 comprise inwardly-facing end toothings 122, 123, respectively, which co-operate with the associated end toothings 128, 129 of the differential disc 125. The side gears 120, 121 are rotatable in the direction opposite to the direction of rotation of the differential disc 125, which is moveable in a wobbly manner between the side gears 120, 121. The differential disc 125 is rotatingly driven by driveshaft 149, which is connected to a ball hub 143 of a ball joint unit, the outer ball joint part being formed by the differential disc 125, with torque-transmitting balls 146 engaging ball grooves 145 of the hub member 143 and ball grooves 147 of the disc body of the differential disc 125. The balls 146 roll in the ball grooves and permit the wobbling movement of the differential disc 125. A cage 148 holds the balls 146 in a common plane and guides them to the angle-bisecting plane between the central plane of the hub member 143 and the central plane of the differential disc 125. The side gear 120 is supported relative to the housing part 112 by an axial bearing 130, with the side gear 121 being supported directly on the retaining ring 113. The differential thus comprises the following functional elements: the side gear 120 driveable by the side shaft 140, the side gear 121 driveable via the sleeve 119 by the toothing 141, and the differential disc 125 driveable via the joint unit by driveshaft 149. The differential carrier 111 is freely rotatable relative to those elements, and only serves to accommodate those elements axially. The differential carrier 111 is also supported in a housing. It is possible to deviate from the arrangement described above by non-rotatably connecting the side gear 121 to the differential carrier 111, and introduce torque through the differential carrier 111 to the side gear 121.

Figure 6:
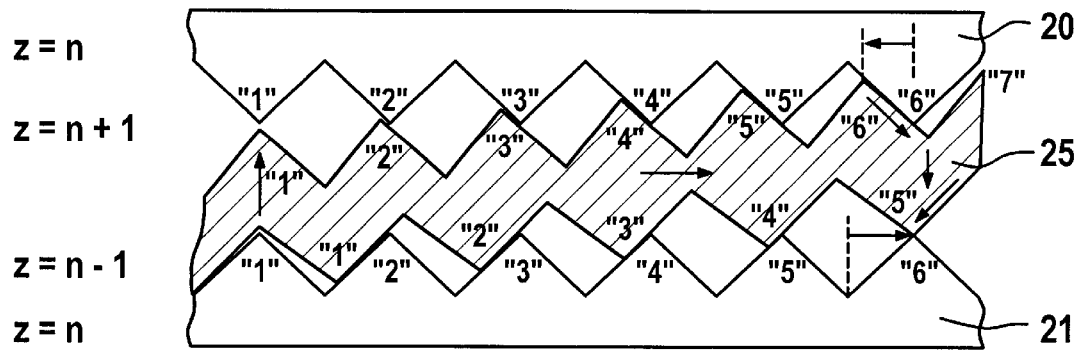
FIG. 6 is a partially-developed side view (180°) of the gear set of a locking differential forming the first embodiment of the present invention, showing the intermediate differential disc between the inter-engaging side gears.

FIG. 6 shows the two side gears 20, 21 comprising end toothings having the same number of teeth (z=n), and the number of teeth of each set of end toothings disposed circumferentially (360°) around each side of the differential disc 25 differing by one (1) from the number of teeth of each of the two side gears 20, 21, being one (1) greater (z=n+1) on one side and one (1) less (z=n-1) on the other side. The direction of rotation and the wobbling movements of the differential disc 25 and the relative rotational movements of the side gears 20, 21 are indicated by arrows. Only half (180°) of the circumferential extent of the end toothings are developed in FIG. 6. The gear teeth shown are all consecutively numbered. A differential movement between the side gears 20, 21 is achieved by the different ratios of the numbers of teeth of the side gears 20, 21 and of the numbers of teeth on both sides of the differential disc 25, in conjunction with the wobbling movement of the differential disc 25 within the differential carrier 11. Through one complete (360°) wobbling movement of the differential disc 25, one side gear lags by one tooth relative to the differential disc 25, while the other side gear leads by one tooth relative to the differential disc 25, There is thus achieved a differential function. The differential disc 25 can be non-rotatably connected to the differential carrier 11 or to an inner driveshaft.

Figure 7:
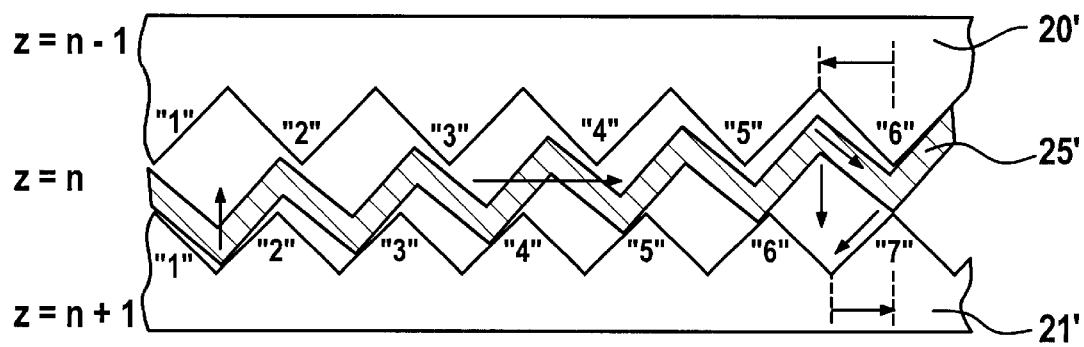
FIG. 7 is a partially-developed side view (180°) of the gear set of a locking differential forming the second embodiment of the present invention, showing the intermediate differential disc between the inter-engaging side gears.

FIG. 7 shows the differential disc 25' having the same number of teeth (z=n) on each side, and two differently-designed side By gears 20', 21', the number of teeth of each set of end toothings disposed circumferentially (360°) around side gears 20', 21' and differing by one (1) from the number of teeth of the differential disc 25', being one (1) greater (z=n+1) on side gear 21' and one (1) less (z=n-1) on side gear 20'. As in FIG. 6, only half (180°) of the circumferential extent of the end toothings are developed in FIG. 7, with complete engagement of one tooth of the differential disc 25' with side gear 20' occurring at the right end and complete engagement of another tooth of the differential disc 25' with side gear 21' occurring at the left end. The direction of rotation and the wobbling movements of the differential disc 25' and the relative rotational movements of the side gears 20', 21' are indicated by arrows. The gear teeth shown are all consecutively numbered. A differential movement between the side gears 20', 21' is achieved by the different ratios of the numbers of teeth of the side gears 20', 21' and of the numbers of teeth on both sides of the differential disc 25', in conjunction with the wobbling movement of the differential disc 25' within the differential carrier 11'. Through one complete (360°) wobbling movement of the differential disc 25', one side gear lags by one tooth relative to the differential disc 25', while the other side gear leads by one tooth relative to the differential disc 25'. As before, there is thus achieved a differential function.

Certain modifications and variations of the disclosed embodiments of the present invention will be apparent to those skilled in the art. It should be understood that the disclosed embodiments are intended to be illustrative only, and not in any way restrictive of the scope of the invention as defined by the claims set forth hereunder.

I claim:

1. A locking differential having a rotatable differential carrier rotatable around an axis, with a pair of spaced-apart side gears contained within the differential carrier and rotatable relative to one another, and having a differential component which co-operates with the side gears by means of alternately-engaging toothings and which is non-rotatably coupled to the differential carrier so as to rotate therewith, wherein:

(1) said spaced-apart side gears each comprise end toothings which face one another; and (2) said differential component comprises a differential disc with two faces, each face comprising end toothings, the end toothings on one of said faces cooperating with the end toothings on one of said side gears, and the end toothings on the other of said faces cooperating with the end toothings on the other of said side gears, with the number of teeth of each pair of inter-engaging end toothings differing by one tooth and with the ratio of the number of teeth of both pairs of inter-engaging end toothings being unequal; and (3) said differential disc is moveable in wobbly manner between said side gears so that, by means of diametrically-opposed portions of the two end toothings of the differential disc, said differential disc engages said end toothings of both of said side gears, (4) wherein said differential disc comprises peripherally-disposed driving elements, and said differential carrier comprises off-center longitudinal guiding means, said driving elements and said longitudinal guiding means engaging one another so as to non-rotatably couple each to the other, (5) and wherein circumferentially-distributed, radially-extending journals, with rolling members disposed on said journals, are secured to said differential disc as driving elements and engage corresponding circumferentially-distributed longitudinal guiding in said differential carrier.

2. A locking differential having a rotatable differential carrier rotatable around an axis, with a pair of spaced-apart side gears contained within the differential carrier and rotatable relative to one another, and having a differential component which co-operates with the side gears by means of alternately-engaging toothings and which is non-rotatably coupled to the differential carrier so as to rotate therewith, wherein:

(1) said spaced-apart side gears each comprise end toothings which face one another; and (2) said differential component comprises a differential disc with two faces, each face comprising end toothings, the end toothings on one of said faces cooperating with the end toothings on one of said side gears, and the end toothings on the other of said faces cooperating with the end toothings on the other of said side gears, with the number of teeth of each pair of inter-engaging end toothings differing by one tooth and with the ratio of the number of teeth of both pairs of inter-engaging end toothings being unequal; and (3) said differential disc is moveable in wobbly manner between said side gears so that, by means of diametrically-opposed portions of the two end toothings of the differential disc, said differential disc engages said end toothings of both of said side gears, (4) wherein said differential disc comprises peripherally-disposed driving elements, and said differential carrier comprises off-center longitudinal guiding means, said driving elements and said longitudinal guiding means engaging one another so as to non-rotatably couple each to the other, (5) and wherein circumferentially-distributed, radially-extending journals, with sliding blocks disposed on said journals, are secured to said differential disc as driving elements and engage corresponding circumferentially-distributed longitudinal guiding in said differential carrier.

3. A locking differential according to either of claim 1 or 2, wherein said differential disc comprises two sets of end toothings, each set having the same number of teeth, and one of said side gears comprises a set of end toothings having one tooth less than either of said two sets of end toothings of said differential disc, and the other of said side gears comprises a set of end toothings having one tooth more than either of said two sets of end toothings of said differential disc.

4. A locking differential according to either of claim 1 or 2, wherein said each of said side gears comprises a set of end toothings with identical numbers of teeth, and said differential disc comprises two sets of end toothings, one set comprising a set of end toothings having one tooth less than either of said sets of end toothings of said side gears, and the other set comprising a set of end toothings having one tooth more than either of said sets of end toothings of said side gears.

5. A locking differential according to either of claim 1 or 2, wherein said differential carrier comprises a flange and rotatable driving means secured to said differential carrier by said flange, and output shafts are connected to said side gears, said output shafts being rotatably inserted into said differential carrier.

* * * * *